United States Patent
Fuh et al.

(10) Patent No.: US 8,671,289 B2
(45) Date of Patent: Mar. 11, 2014

(54) MULTI-PORT INTERFACE CIRCUIT AND ASSOCIATED POWER SAVING METHOD

(75) Inventors: Jin-Chyuan Fuh, Hsinchu Hsien (TW); Pin-Chieh Huang, Hsinchu Hsien (TW); Shu-Rung Li, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 288 days.

(21) Appl. No.: 13/152,153

(22) Filed: Jun. 2, 2011

(65) Prior Publication Data

US 2012/0054517 A1 Mar. 1, 2012

Related U.S. Application Data (60) Provisional application No. 61/377,442, filed on Aug. 26, 2010.

(51) Int. Cl.
*G06F 1/32* (2006.01)

(52) U.S. Cl.
USPC ........... 713/300; 713/310; 713/320; 713/321; 713/322; 713/323; 713/324; 713/330; 713/340

(58) Field of Classification Search
USPC .................. 713/300, 310, 320–324, 330, 340
See application file for complete search history.

(56) References Cited

U.S. PATENT DOCUMENTS

| | | | | |
|---|---|---|---|---|
| 6,862,742 | B2 * | 3/2005 | Komatsu et al. | 725/117 |
| 7,698,617 | B2 * | 4/2010 | Cankaya et al. | 714/751 |
| 7,848,303 | B2 * | 12/2010 | Lindstrom et al. | 370/343 |
| 7,855,971 | B2 * | 12/2010 | Ito | 370/249 |
| 8,060,663 | B2 * | 11/2011 | Murray et al. | 710/8 |
| 8,356,322 | B2 * | 1/2013 | Wells et al. | 725/78 |
| 2003/0135862 | A1 * | 7/2003 | Komatsu et al. | 725/95 |
| 2005/0193419 | A1 * | 9/2005 | Lindstrom et al. | 725/71 |
| 2007/0260921 | A1 * | 11/2007 | Cankaya et al. | 714/18 |
| 2008/0080490 | A1 * | 4/2008 | Ito | 370/362 |
| 2011/0029701 | A1 * | 2/2011 | Murray et al. | 710/69 |
| 2011/0072472 | A1 * | 3/2011 | Wells et al. | 725/78 |

* cited by examiner

*Primary Examiner* — M Elamin
(74) *Attorney, Agent, or Firm* — Han IP Corporation (57) ABSTRACT

In one aspect, a multi-port interface circuit applied to a playback apparatus which is able to switch among a plurality of input ports coupled to a plurality of source devices for playing back. Each input port has a receiver, the receiver including a front-end for receiving and processing a data stream from the source device and providing a data enable signal, and further including a content protection circuit for performing content protection according to the data enable signal. Each receiver records data enable information associated with the data enable signal of the data stream in an initial status. When one input port is selected, receivers of the other input ports operate in a power saving mode, the front-end circuits stop receiving the data stream, and the content protection circuit maintains operation according to a regenerated enable signal, which is regenerated according to the data enable information.

17 Claims, 8 Drawing Sheets

MULTI-PORT INTERFACE CIRCUIT AND ASSOCIATED POWER SAVING METHOD

CROSS-REFERENCE TO RELATED PATENT APPLICATIONS

This patent application claims priority to U.S. provisional Patent Application No. 61/377,442 filed on Aug. 26, 2010, which is herein incorporated in its entirety by reference.

BACKGROUND

1. Technical Field

The present disclosure relates to a multi-port interface circuit and associated power saving method, and more particularly, to a multi-port interface circuit and associated power saving method capable of switching between multiple input ports and effectively saving power consumption without re-identifying content protection.

2. Description of Related Art

A multimedia playback apparatus, e.g., a television (TV), a monitor, an audible apparatus and a display, has an interface circuit for receiving a source apparatus that provides a multimedia data stream. In the modern information society, since the source apparatus becomes diversified, an interface circuit of a modern playback apparatus has a plurality of input ports that are respectively coupled to difference source apparatuses. A user selects one of the input ports to playback by a playback apparatus a data stream in the selected input port. For example, the source apparatus is a satellite, a set-up box (STB) of a wired and/or wireless TV, a hard disk, a memory card and/or a compact disc (CD) player, a game console, an audio-visual (AV) amplifier and/or an equalizer, or an AV capturing apparatus, e.g., a mobile, a digital camera, a digital video recorder, and the like. In order to meet requirements of the diversified source apparatuses, the interface circuit having a plurality of input ports is a basic demand of the modern playback apparatus.

In order to protect the copyright of a multimedia data content production, content protection of a data stream becomes a development trend of the modern multimedia technology. When a data stream is to be transmitted from a source apparatus to a playback apparatus, a mechanism for performing content protection on the data stream between the source apparatus and the playback apparatus is simply described below. A data stream transmitter of the source apparatus identifies with a receiver of the playback apparatus according to a predetermined protocol, and legally transmits the data stream only after it is determined that the transmitter and the receiver are authorized. After the identification, an encryption/decryption parameter (e.g., key information and/or a pseudo random sequence for encryption/decryption) between the transmitter and the receiver is coordinated. According to the encryption/decryption parameter, the transmitter encrypts and transmits AV multimedia content of the data stream to the receiver, and the receiver decrypts content carried in the data stream for playback. Since the data stream between the transmitter and the receiver is encrypted, the content of the data stream cannot be accurately obtained even if the data stream between the transmitter and the receiver is tapped and intercepted to achieve an object of content protection.

Since the data stream extends as time goes by, content protection also needs to be periodically synchronized in the form of a stream. That is, the transmitter and the receiver synchronously periodically update/initialize the encryption/decryption parameter (e.g., the pseudo random sequence for encryption/decryption) according to the parameter coordinated during identification, and periodically exchange identification information to confirm whether the previous identification status is maintained. When either the transmitter or the receiver interrupts synchronization of the content protection, both of them need to spend excessive time in re-identification. In other words, during an extension period of the data stream, the transmitter and the receiver need to maintain content protection synchronization to maintain the identification status.

SUMMARY

In a multi-port interface circuit having numerous input ports each comprising a receiver, each of source apparatus respectively coupled to the input ports comprises a corresponding transmitter. That is, each input port of the multi-port interface circuit comprises a transmitter and a matched receiver. Only one of the source apparatuses coupled to the input ports provides a data stream that is inputted into a playback apparatus for playback via the selected input port, so that other receivers of other input ports need not receive the data stream. For example, a first input port and a second input port of the playback apparatus are respectively coupled to a first source apparatus and a second source apparatus. The first source apparatus comprises a first transmitter for transmitting a first data stream to a first receiver of the first input port, and the second source apparatus comprises a second transmitter for transmitting a second data stream to a second receiver of the second input port. When a user wishes to play content provided by the first source apparatus, the first receiver operates to receive a first data stream. At this point, although the second source apparatus provides a second data stream, the second receiver stops operating and receiving the second data stream since the second data stream is not to be played.

However, according to the abovementioned content protection technology, when the second receiver stops receiving the second data stream when the second input port is not selected, content protection synchronization between the second transmitter and the second receiver is interrupted, so that an identification relationship between them cannot be maintained. When the user switches the first input port to the second input port, it consumes a signification amount of time to re-identify the content protection between the second transmitter and the second receiver. Generally speaking, re-identification costs several seconds or a longer period of time, and before re-identification completes, the second receiver cannot accurately decrypt the second data stream, so that the playback apparatus cannot normally plays content of the second data stream. Therefore, when the first input port is switched to the second input port, the user perceives an obvious switch delay. Not only user visual experience is interrupted by the switch delay, but also multimedia cannot be smoothly played. In addition, the delay misleads the user to erroneously assume that the playback apparatus does not accurately operate when the user controls the playback apparatus to switch input ports and the played content is not switched in real-time, which means that operating response of the playback apparatus is unkind thereby bothering the user.

In order to solve the delay created by re-identification during switching of the input ports, in an embodiment, the receivers of the input ports continuously receive corresponding data streams regardless of whether the input ports are selected. For example, when the user selects the first input port, the second receiver of the second input port still continuously receives the second data stream transmitted by the second transmitter. Although the second data stream is not to be played, continuous operation of the second receiver ensures content protection synchronization between the second transmitter and the second receiver. When the user switches the first input port to the second input port, the second transmitter need to be re-identified with the second receiver to directly decrypt the second data stream, so that the playback apparatus seamlessly switch to play content of the second data stream.

However, one disadvantage of the foregoing embodiment is that unnecessary power consumption is created. Since the receivers of the input ports normally receive corresponding data streams but only the data stream received by one certain receiver is to be played, reception operations of other receivers are wasted, so that unnecessary power consumption is created. For example, in a four-port interface circuit having four receivers, although a data stream received by one certain receiver is to be played at one time, other three receivers still continuously consume power consumption to maintain reception of the corresponding data streams, thereby consuming a larger amount of power as well as deteriorating efficiency of power consumption of the multi-port interface circuit.

Each receiver of the multi-port interface circuit comprises a front-end circuit and a content protection circuit. When the receiver receives a data stream, the front-end circuit performs sampling, data recovery, decoding and/or parallel-to-serial transformation on the data stream to retrieve encrypted content (e.g., an encrypted pixel data), control signals or timing signals from the data stream. Functions of the content protection circuit are realized by a parameter function block and a decryption function block. The parameter function block updates the encryption/decryption parameter according to a timing signal and a control signal to maintain synchronization of content protection, and the decryption function block decrypted encrypted content (e.g., performing exclusive-OR gate (XOR) calculation on an encrypted pixel data and a pseudo random sequence) according to the encryption/decryption parameter (e.g., the pseudo random sequence) provided by the parameter function block. Since the front-end circuit receives and processes the data stream signal by implementing an analog circuit and a digital circuit, it consumes a large amount of power. Compared to the front-end circuit, the content protection circuit performing digital calculation consumes less power.

A solution is developed according to the present disclosure so as to balance switch smoothness with power efficiency of the input ports. A control signal for maintaining content protection synchronization presents in a vertical blanking interval (VBI) of a data stream. Therefore, in this solution, a front-end circuit of a receiver of the un-selected input port only operates to provide the control signal during the VBI, and stops operating during other intervals. A simplified regenerating circuit regenerates a timing signal (e.g., a data enable signal) for operating the content protection circuit, so that the parameter function block of the content protection circuit continuously maintains content protection synchronization with the receiver according to the control signal and the regenerated timing signal. Due to the regenerated timing signal, even if the front-end circuit does not continuously operate, not only unnecessary power consumption is avoided, but also delay of the input ports is overcome to maintain switch smoothness thereby realizing seamless switch.

One object of the present disclosure is to provide a power saving method applied to a multi-port interface circuit comprising a plurality of receivers, each of which corresponds to an input port and comprises a front-end circuit. The method comprises steps below. In a normal mode, a front-end circuit processes a corresponding data stream, correspondingly provides/generates a data enable signal, and provides/records data enable information associated with the data enable signal according to the data enable signal. When a certain input port is not selected, the receiver corresponding to the input port enters a power saving mode. In the power saving mode, a regenerated enable signal is provided according to the data enable information corresponding to the input port, and the front-end circuit of the input port stops receiving the data stream and providing the data enable signal to save power consumption of the front-end circuit.

An AV multimedia data stream comprises a plurality of active intervals and a plurality of blanking intervals, and each of the active intervals carries a plurality of pixel data to form a frame. Each blanking interval between two adjacent active intervals is a horizontal blanking interval (HBI) or a VBI. The data enable signal, a timing signal for performing content protection synchronization, comprises a plurality of enable intervals each corresponding to an active interval. The step of providing the regenerated enable signal according to the data enable information is to reconcile timing variations of the regenerated enable signal with those of the data enable signal. When the front-end circuit stops providing the data enable signal, content protection synchronization is maintained according to the regenerated enable signal.

With respect to the data of each input port, the corresponding data enable information is provided according to a start time point and an end time point of an active interval. The data stream is transmitted together with a clock that is a pixel clock having a cycle synchronized with each pixel data. The start time point and the end time point of the active interval are counted according to the clock to provide a start point count value and an end point count value for the data stream. The data enable information is provided to the data stream according to the start point count value and the end point count value. When the receiver of the unselected input port operates in the power saving mode, the regenerated enable signal is provided according to the clock of the data stream and the data enable information.

More specifically, in the power saving mode, a count value is counted according to triggering of cycles of the clock. When the count value is equal to the start point count value, the regenerated enable signal is changed from a first logic level (e.g., logic "0") to a second logic level (e.g., logic "1"). When the count value is equal to the end point count value, the regenerated enable signal is changed from the second logic level to the first logic level, and the count value is redefined as an initial value. Accordingly, an interval during which the regenerated enable signal remains at the second logic level corresponds to the active interval of the data stream, so as to reconcile the regenerated enable signal with the data enable signal provided by the front-end circuit. Even if the front-end circuit does not provide any data enable signal for power saving purposes, the regenerated enable signal can still replace the data enable signal to maintain content protection synchronization of the content protection circuit according to the regenerated enable signal.

Content carried by the data steam comprises a plurality of frames each comprising a plurality of first horizontal intervals and a plurality of second horizontal intervals. The first horizontal intervals form a VBI. Each second horizontal interval carrying active pixel data includes HBIs and active intervals. Data enable information corresponding to the data stream is provided according to start time points and end time points of the second horizontal intervals of the frames and start time points and end time points of the active intervals of the second horizontal intervals. When the receiver of the unselected operates in the power saving mode, the front-end circuit processes the data stream during the first horizontal intervals to provide a control signal for content protection synchronization. During the second horizontal intervals, the front-end circuit stops processing the data stream and providing the data enable signal to reduce power consumption of the front-end circuit.

According to an embodiment of the present disclosure, the start time points and the end time points of the second horizontal intervals of the frames are counted according to a clock to respectively provide a vertical start point count value and a vertical end point count value, and start time points and end time points of the active intervals of the second horizontal intervals are counted according to the clock to respectively provide a pixel start point count value and a pixel end point count value. The data enable information corresponding to the data stream is provided according to the pixel start point count value, the pixel end point count value, the vertical start point count value and the vertical end point count value. In the power saving mode, a pixel count value and a line count value are accumulated according to the clock. When the line count value lies within a range from the vertical start point count value to the vertical end point count value, and the pixel count value lies within a range from the pixel start point count value to the pixel end point count value, the regenerated enable signal has the second logic level; otherwise, the regenerated enable signal has the first logic level. When the line count value is larger than the vertical end point count value, the line count value is redefined as a vertical initial value; likewise, when the pixel count value is larger than the pixel end point count value, the pixel count value is redefined as a horizontal initial value. According to the pixel count value and the line count value, intervals during which the regenerated enable signal remains at the second logic level are identical to active intervals of the second horizontal intervals, so that the data enable signal is replaced by the regenerated enable signal.

For the receiver of each input port, when the front-end circuit normally operates and provides the data enable signal, the content protection circuit updates the encryption/decryption parameter of content protection according to the data enable signal. In the power saving mode, even if the front-end circuit stops operating and providing any data enable signal, the content protection circuit can still update the encryption/decryption parameter according to the regenerated enable signal to maintain content protection synchronization. Therefore, the multi-port interface circuit having input ports is provided by the present disclosure. The front-end circuit of the selected input port normally operates, receives and processes the data stream and provides the data enable signal. The front-end circuit of the unselected input port stops providing the data enable signal in the power saving mode, and changes to maintain content protection synchronization according to the regenerated enable signal. Therefore, according to the present disclosure, not only seamless switch of input ports is realized, but also unnecessary power consumption is reduced thereby improving power efficiency.

According to another embodiment of the present disclosure, a multi-port interface circuit comprises a plurality of receivers corresponding to a plurality of input ports. Each of the receivers for receiving a corresponding data stream comprises a front-end circuit, a recording circuit, a regenerating circuit, a clock circuit, a multiplexer and a content protection circuit. The front-end circuit operates in a normal mode and a power saving mode. In the normal mode, the front-end circuit processes the data stream and generates a data enable signal; in the power saving mode, the front-end circuit stops providing the data enable signal to save power consumption. In an embodiment, upon entering the power saving mode, the front-end circuit processes the corresponding data stream during each first horizontal interval of each frame to provide a control signal, and stops receiving/processing the data stream during each second horizontal interval and stops providing the data enable signal.

The recording circuit, coupled to the front-end circuit, records data enable information according to the data enable signal. In the power saving mode, the regenerating circuit coupled to the recording circuit generates a regenerated enable signal according to the recorded data enable information. The multiplexer is coupled to the front-end circuit, the regenerating circuit and the content protection circuit. When the front-end circuit operates in the normal mode and provides the data enable signal, the multiplexer transmits the data enable signal to the content protection circuit; when the front-end circuit operates in the power saving mode, the multiplexer transmits the regenerated enable signal to the content protection circuit, which updates an encryption/decryption parameter according to the signal transmitted from the multiplexer to maintain content protection synchronization. For the plurality of front-end circuits of the input ports, when one of the front-end circuits operates in the normal mode, others enter the power saving mode to save power consumption.

The clock circuit coupled to the data stream provides a clock. The recording circuit records the data enable information according to start time points and end time points of the second horizontal intervals of each frame and start time points and end time points of active intervals of each second horizontal interval. The recording circuit counts the start point time points and the end time points of the second horizontal intervals according to the clock to respectively provide a vertical start point count value and a vertical end point count value, and counts the start time points and the end time points of the active intervals of the second horizontal intervals according to the clock to respectively provide a pixel start point count value and a pixel end point count value, so as to record the data enable information according to the pixel start point count value, the pixel end point count value, the vertical start point count value and the vertical end point count value.

When the front-end circuit enters the power saving mode, the regenerating circuit counts a pixel count value and a line count value according to the clock. When the line count value lies within a range from the vertical start point count value to the vertical end point count value, and the pixel count value lies within a range from the pixel start point count value to the pixel end point count value, the regenerating circuit defines the regenerated enable signal as being a second logic level; otherwise, the regenerating circuit defines the regenerated enable signal as being a first logic level. When the line count value is larger than the vertical end point count value, the regenerating circuit redefines the line count value as a vertical initial value; likewise, when the pixel count value is larger than the pixel end point count value, the regenerating circuit redefines the pixel count value as a horizontal initial value.

Following description and figures are disclosed to gain a better understanding of the advantages of the present disclosure.

DETAILED DESCRIPTION OF THE PREFERRED EMBODIMENTS

Figure 1:
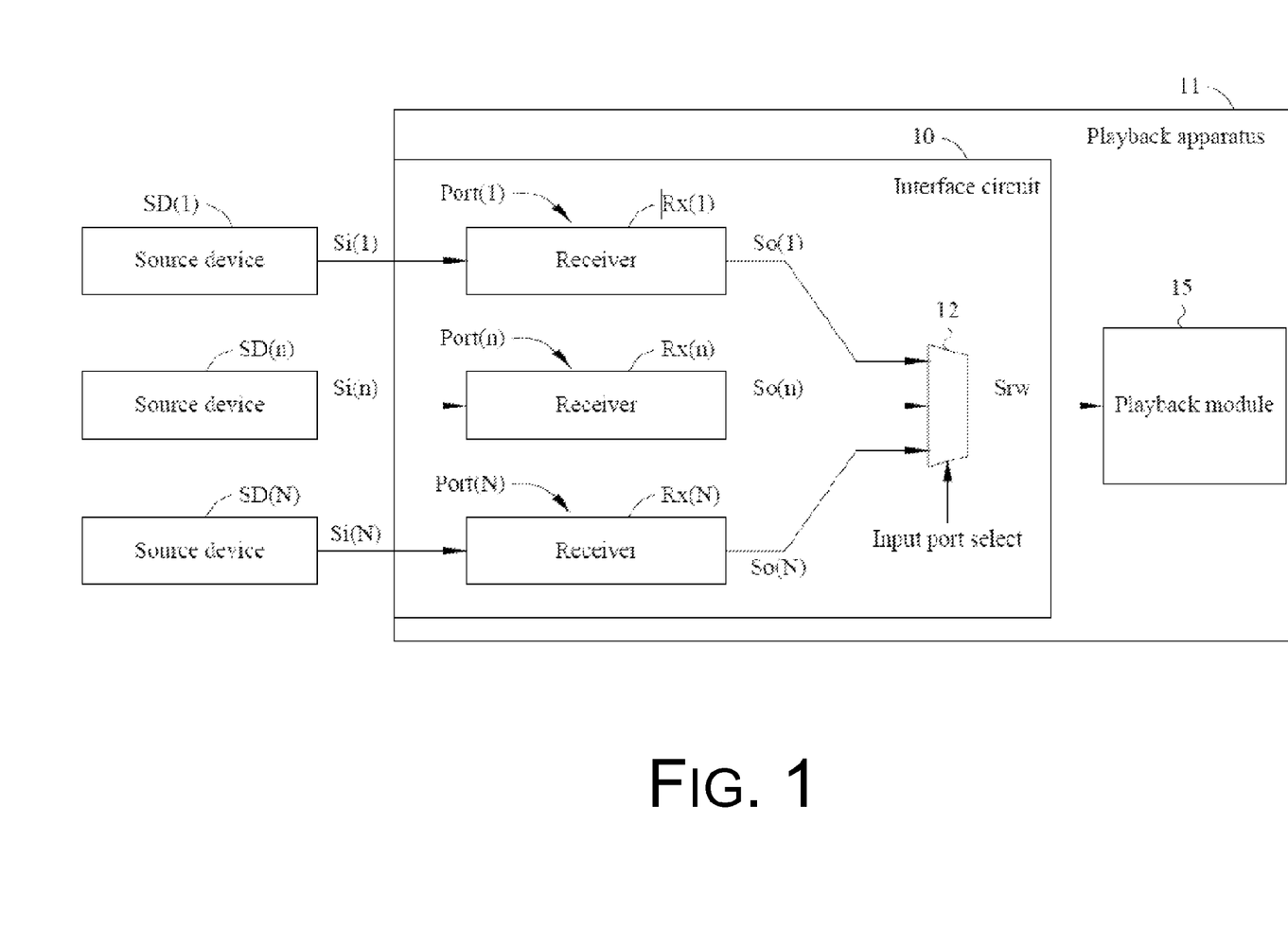
FIG. 1 is a schematic diagram of a multi-port interface circuit applied to a playback apparatus in accordance with an embodiment of the present disclosure.

FIG. 1 illustrates a playback apparatus 11 comprising an interface circuit 10 and a playback module 15 of one embodiment of the present disclosure. The interface circuit 10 is a multi-port interface circuit with a plurality of input ports. In this embodiment, the interface circuit 10 comprises a plurality of receivers Rx(1) to Rx(N) and a switch circuit 12. The receivers Rx(1) to Rx(N) are equipped with input ports Port (1) to Port(N), which are coupled to source devices SD(1) to SD(N). For example, the input ports Port(1) to Port(N) can be digital visual interface (DVI) or a high definition multimedia interface (HDMI). The interface circuit 10 receives a data stream Srw to the playback module 15. The playback module 15 comprises a timing controller, a driving circuit, a display panel and/or a speaker for processing the data stream Srw content to an image and/sound that can be played by the playback module 15.

In the interface circuit 10, the receivers Rx(1) to Rx(N) have identical or similar functions and circuit structures. Take the receiver Rx(n) of the input port Port(n) as an example, when the corresponding source apparatus SD(n) provides a data stream Si(n), the receiver Rx(n) receives and performs corresponding conversion/decoding/decryption on the data stream Si(n) to provide an output data stream So(n) which can be directly played by the playback module 15. The switch circuit 12, coupled between the receivers Rx(1) to Rx(N) and the playback module 15, selects one of the data streams So(1) to So(N) respectively provided by the receivers Rx(1) to Rx(N) through the input ports, and the selected data stream is taken as the data stream Srw transmitted to the playback module 15.

Figure 2:
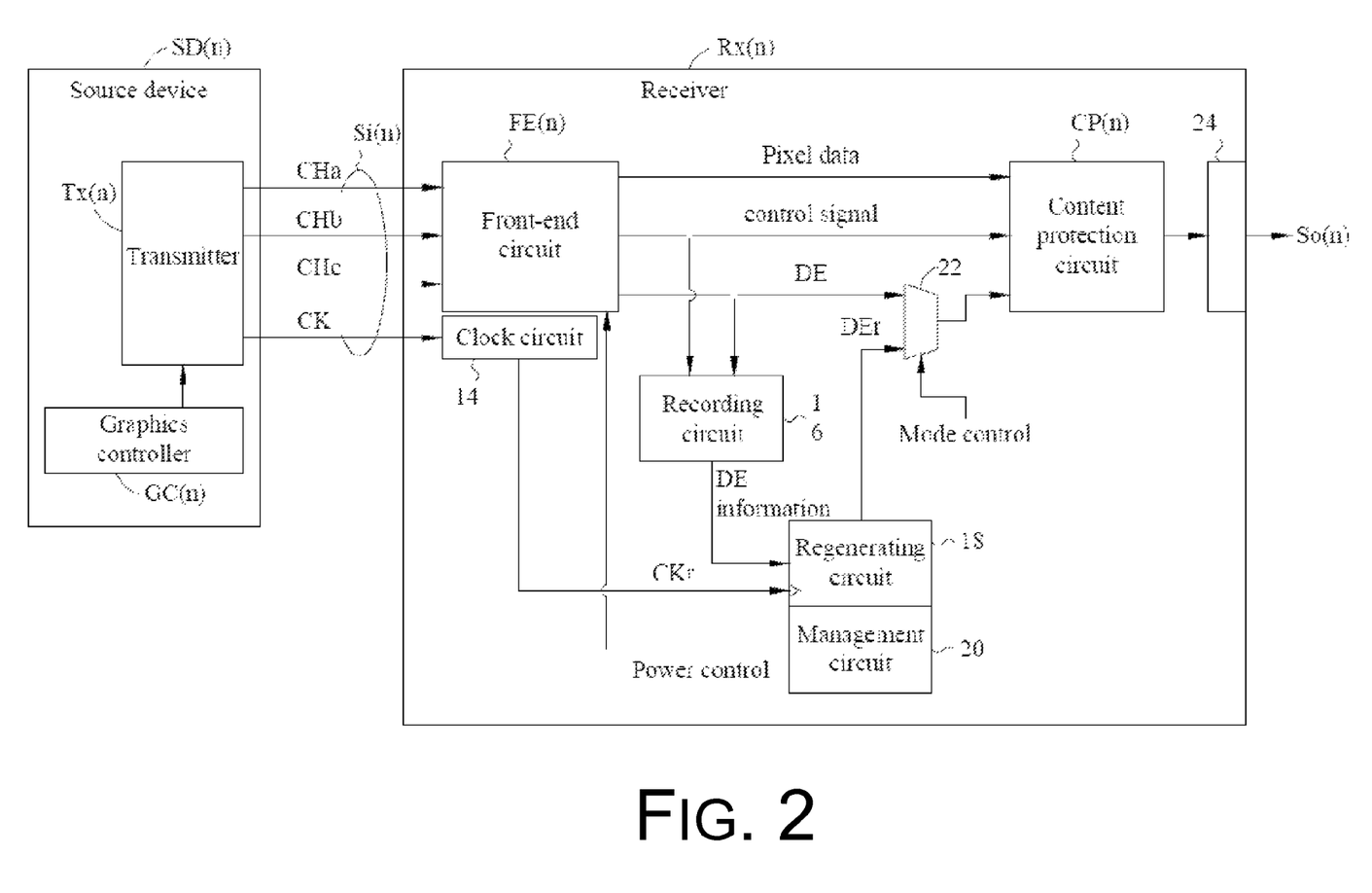
FIG. 2 is a schematic diagram of a receiver of the multi-port interface circuit illustrated in FIG. 1 in accordance with an embodiment of the present disclosure.

FIG. 2 illustrates a schematic diagram of the receiver Rx(n) in accordance with an embodiment of the present disclosure. The receiver Rx(n) is coupled to the source apparatus SD(n) comprising a graphics controller GC(n) and a transmitter Tx(n). Under the control of the graphics controller GC(n), the transmitter Tx(n) uses a clock CK, such as pixel clock, to perform code modulation on multimedia content (e.g., a pixel data) from the source device SD(n) and its control signal, and to encrypt the multimedia content according to requirements of content protection. The transmitter Tx(n) carries the control signal and the encrypted content in the parallel signals of a plurality of channels (e.g., such as channels Cha to CHb in FIG. 2) to form the data stream Si(n).

To work along with the transmitter Tx(n), the receiver Rx(n) comprises a front-end circuit FE(n), a clock circuit 14, a recording circuit 16, a regenerating circuit 18, a management circuit 20, a multiplexer 22, a content protection circuit CP(n) and an output interface 24. The clock circuit 14 is a phase lock loop circuit that provides a synchronized clock CKr according to the clock CK. The front-end circuit FE(n) is coupled to the content protection circuit CP(n), and the recording circuit 16 and the regenerating circuit 18 are coupled between the front-end circuit FE(n) and the multiplexer 22. The content protection circuit CP(n) realizes various functions of content protection of the receiver Rx(n), e.g., identification between the transmitter Tx(n) and the Rx(n), coordination of an encryption/decryption parameters, periodical updating of the encryption/decryption parameter for maintaining content protection synchronization, and decryption of the encrypted content of the data stream Si(n) performed according to the encryption/decryption parameter.

The front-end circuit FE(n) operates in a normal mode or in a power saving mode. When the receiver Rx(n) is selected by the switch circuit 12 (as shown in FIG. 1), and the data stream So(n) is selected as the data stream Srw to the playback module 15, the front-end circuit FE(n) operates in the normal mode. In the normal mode, the front-end circuit FE(n) receives and processes the data stream Si(n), such as sampling, data recovery and decoding on the data stream Si(n), so as to decode the encrypted content (e.g., the encrypted pixel data) and the control signal carried by the data stream Si(n) and to generate a data enable signal DE therefrom. In the normal mode, in association with the front-end circuit FE(n), the multiplexer 22 transmits the data enable signal DE to the content protection circuit CP(n). Accordingly, the content protection circuit CP(n) synchronously updates the encryption/decryption parameter according to the control signal and the data enable signal DE, and decrypts the encrypted content generated by the front-end circuit FE(n) according to the encryption/decryption parameter, so that the decrypted content (i.e., the pixel data) is outputted via the output interface layer 24 as the data stream So(n) to be played. In the normal mode, the recording circuit 16 records the data enable information associated with the data enable signal DE.

In contrast, when the input port Port(n) of the receiver Rx(n) is not selected, the switch circuit 12 transmits a data stream So(n') of another receiver Rx(n') to the playback module 15, where n' is not equal to n. Accordingly, the receiver Rx(n) does not need to continuously provide the data stream So(n). When the input port Port(n) is not selected, the front-end circuit of the receiver Rx(n) changes to the power saving mode. Consequently, to save power consumption, the front-end circuit FE(n) temporarily stops data recovery and decoding process function, so that the data enable signal DE cannot be retrieved.

However, as mentioned above, in order to realize seamless switch of the input ports, even though the receiver Rx(n) is not selected, it is desired to maintain content protection synchronization between the transmitter Tx(n) and the receiver Rx(n) to avoid extra time consumption for re-identifying content protection between the transmitter Tx(n) and the receiver Rx(n) when the receiver Rx(n) is selected at a later time. Because the content protection circuit CP(n) performs content protection synchronization via the control signal and the data enable signal DE, in the power saving mode, the regenerating circuit 18 generates a regenerated enable signal DEr according to a clock CKr and the data enable information which is obtained earlier or obtained in an initial status, then the multiplexer 22 transmits the regenerated enable signal DEr for synchronization to the content protection circuit CP(n). In addition, the management circuit 20 temporarily recovers to operate the front-end circuit FE(n) at an appropriate moment, such as in an initial status, to obtain the control signal. The control signal of the data stream Si(n) is only obtained during certain predetermined intervals (such as a VBI described below), so that it is only necessary for the management circuit 20 to turn on the front-end circuit FE(n)

to recover normal operation in these predetermined intervals. During other intervals, the management circuit 20 turns off the front-end circuit FE(n) to reduce power consumption. Therefore, in the power saving mode, because operations of the regenerating circuit 18, the management circuit 20 and the multiplexer 22 continue, the content protection circuit CP(n) is able to use the regenerated enable signal DEr as an initial enable signal for starting a next normal mode even if the front-end circuit FE(n) does not continuously provide the current data enable signal DE. Therefore, when the next normal mode starts, content protection synchronization between the receiver Rx(n) and the transmitter Tx(n) is maintained without consuming excessive time to obtain the data enable signal.

Figure 3:
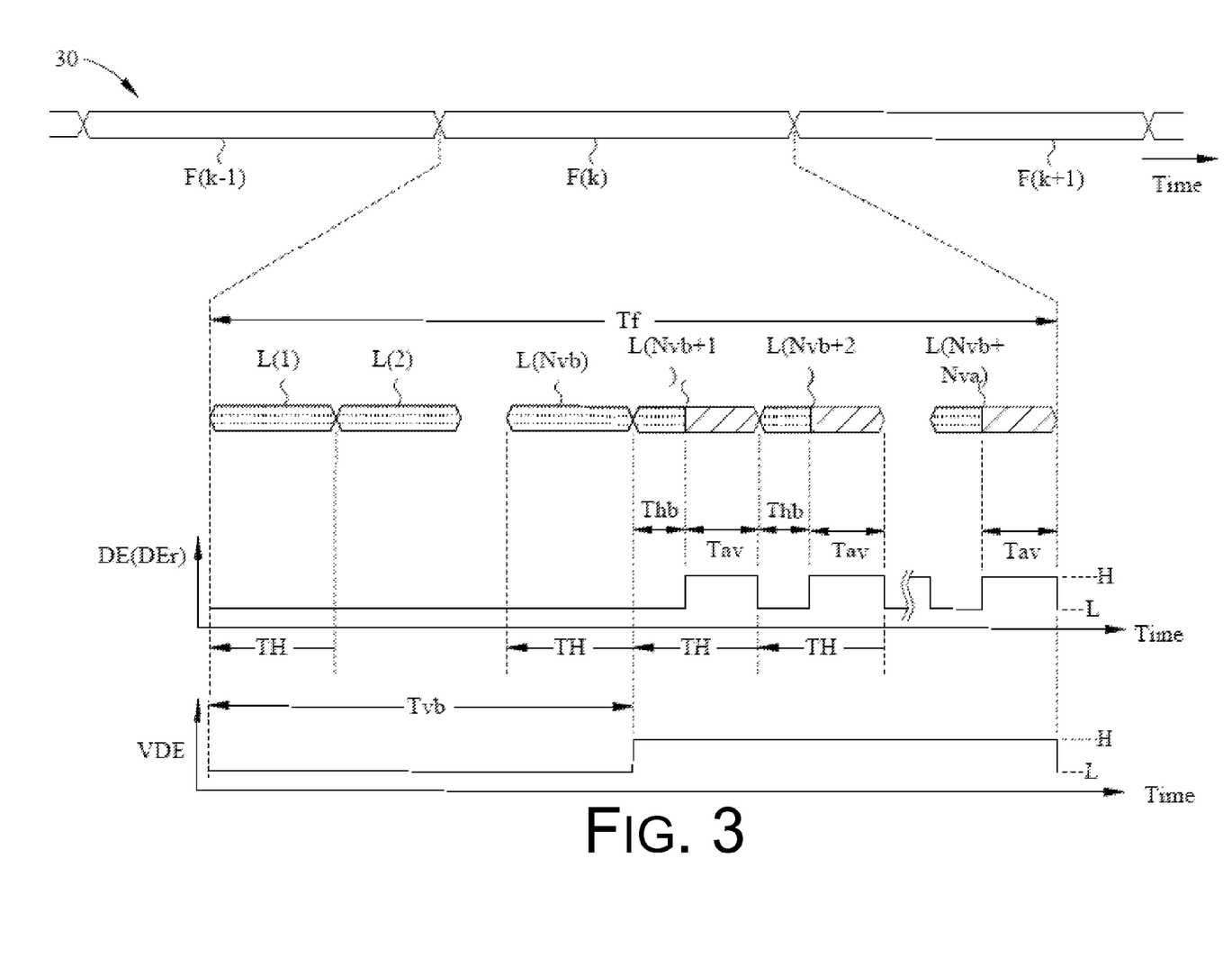
FIG. 3 and FIG. 4 are schematic diagrams of timing of associated signals illustrated in FIG. 2 in accordance with an embodiment of the present disclosure.
Figure 4:
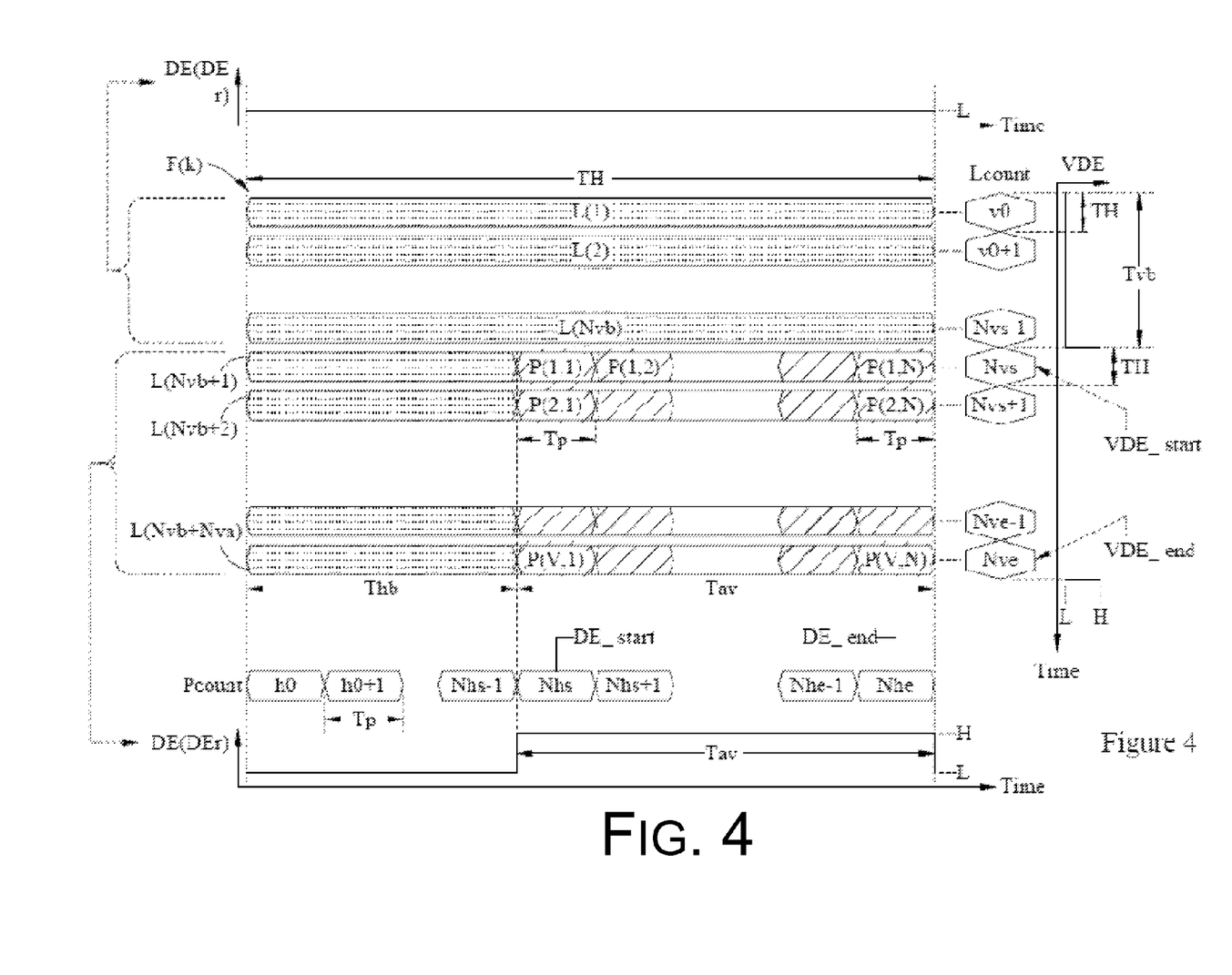

With reference to FIG. 3, a schematic timing diagram of a data stream via content 30 carried in the data stream Si(n)/So(n) is shown. The content 30 comprises a plurality of frames arranged in sequence, such as frames F(k−1), F(k) and F(k+1), etc., and each of the frames lasts for a frame cycle Tf. FIG. 4 shows a schematic timing diagram of each frame by taking the frame F(k) as an example. The frame F(k) comprises a plurality of line signals L(1) to L(Nvb) and L(Nvb+1) to L(Nvb+Nva), and each line signal lasts for a horizontal interval 'TH'. The line signals L(1) to L(Nvb) from a vertical blanking interval (VBI) 'Tvb', and each horizontal interval 'TH' is further divided into an horizontal blanking interval (HBI) 'Mb' and an active interval 'Tav'. Each active interval 'Tav' has a plurality of pixel cycles Tp, of each corresponding to a pixel data (e.g., an RGB component of a pixel). For example, the line signal L(Nvb+1) has pixel data P(1, 1), P(1, 2) to P(1, N), and the line signal L(Nvb+Nva) has pixel data P(V, 1) to P(V, N). The pixel data P(1, 1) to P(V, N) form an image of a frame F(k) which is seen on the screen. Therefore, the intervals which the pixel data last are active intervals. Compared to the active intervals, because in the horizontal intervals TH of the VBI 'Tvb' and the HBIs 'Mb' no pixel data are present, those intervals are regarded as blanking intervals. Because pixel data content and the control signal are carried in a same channel, the control signal is allotted in the blanking intervals. For example, the control signal (e.g., CTRL3) for maintaining content protection synchronization is a one-bit signal that is present in the VBI 'Tvb'.

Data stream content is divided as in blanking intervals or in active intervals according to a pixel clock, of which a clock cycle is equal to a pixel cycle Tp, and each cycle of the pixel clock is synchronized with a pixel data. The clock CK illustrated in FIG. 2 can be the pixel clock.

As mentioned above, the receiver Rx(n) performs content protection synchronization according to a data enable signal DE. FIG. 3 and FIG. 4 also illustrate timing of the data enable signal DE by means of waveform, which logic level H (e.g., logic "1") represents the active interval 'Tav', and logic level L (e.g., logic "0") represents other intervals. For example, as shown in FIG. 3, during the frame cycle Tf of the frame F(k), the data enable signal DE remains at the logic level H in a plurality of intervals (i.e., enable intervals) which correspond to the active intervals 'Tav' of the line signals L(Nvb+1) to L(Nvb+Nva). During the VBI 'Tvb' and the horizontal intervals Thb of the line signals L(Nvb+1) to L(Nvb+Nva), the data enable signal is at the logic level L.

In the normal mode, after the front-end circuit FE(n) of the receiver Rx(n) receivers and processes the data stream Si(n), not only encrypted content carried in the data stream Si(n) is obtained, but also the data enable signal DE is derived. For example, for the DVI and HDMI specification, the front-end circuit FE(n) identifies the pixel data according to signal transition times per time unit to further switch the data enable signal DE at the logic level H to indicate the active interval 'Tav' of the pixel data. According to the present disclosure, in the power saving mode, the regenerating circuit 18 illustrated in FIG. 2 generates a regenerated enable signal DEr with timing synchronized to the timing of the data enable signal DE. Since the timing of the data enable signal DE is known, characteristics of the data enable signal DE are associated with following factors: a start time point and an end time point of the active interval Tav of each horizontal interval TH, and a start time point and an end time point of the line signals L(Nvb+1) to L(Nvb+Nva) of each frame F(k). The factors are data enable information dependent on characteristics of the data stream (e.g., a horizontal resolution and a vertical resolution of each frame). Preferably, the data enable information of the data stream is obtained to rebuild timing of the data enable signal in the regenerated enable signal. Therefore, the receiver Rx(n) operates in the normal mode in an initial status no matter whether the receiver Rx(n) is selected, so that the receiver Rx(n) can obtain the data enable information before it goes to power saving mode to support the power saving mode.

Figure 5:
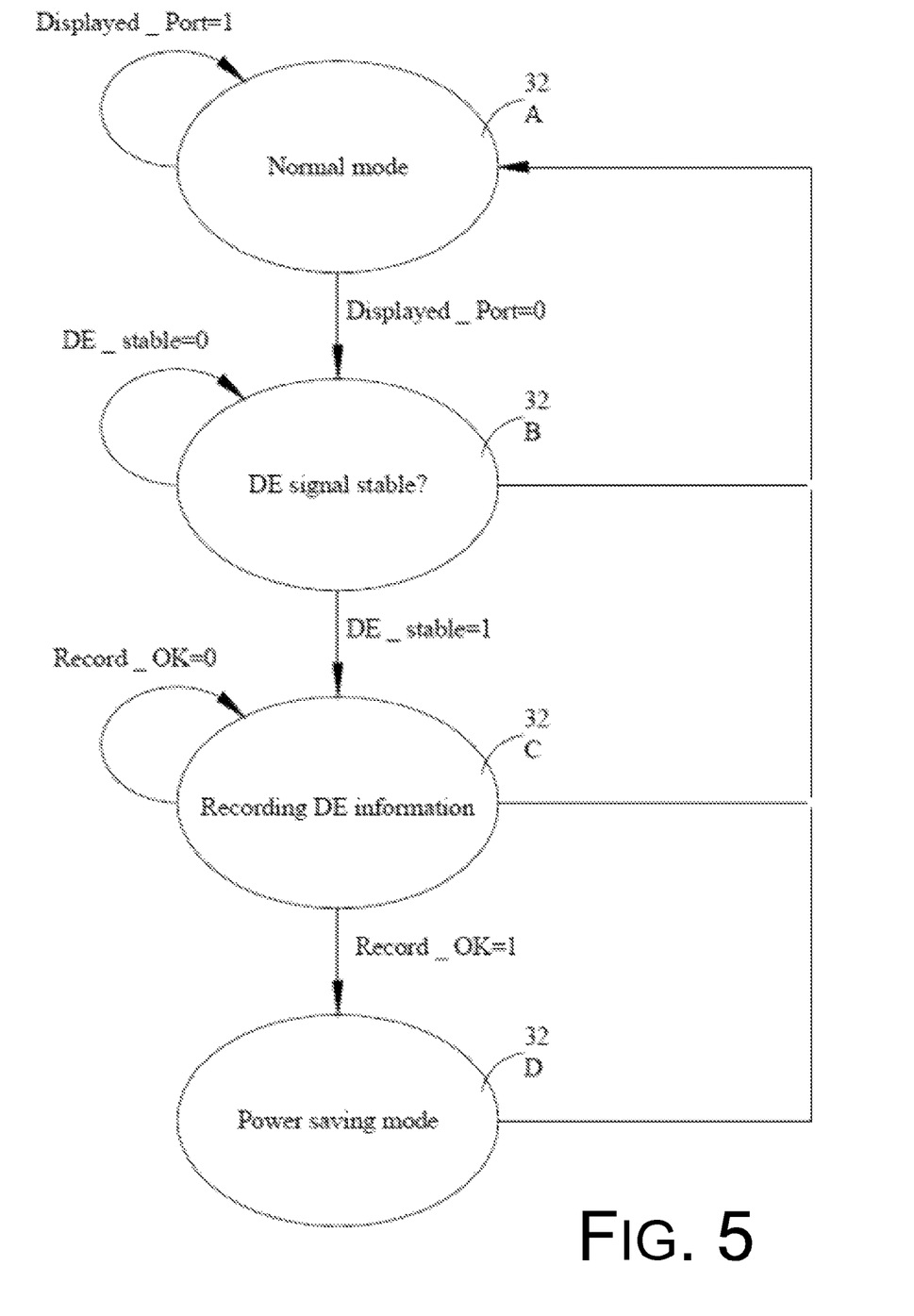
FIG. 5 is a schematic diagram of a mechanism of operating statuses of the receiver illustrated in FIG. 2 in accordance with an embodiment of the present disclosure.

FIG. 5 shows a schematic diagram of a status mechanism of the receiver Rx(n) in accordance with an embodiment of the present disclosure. FIG. 5 shows conditions of status switch of one embodiment of the present disclosure Status 32A: the receiver Rx(n) is in the normal mode. When the transmitter Tx(n) (as shown in FIG. 2) starts to transmit the data stream Si(n) at an initial status, no matter whether the receiver Rx(n) is selected, the receiver Rx(n) first operates in the normal mode. The front-end circuit FE(n) receives the data stream Si(n) and performs data sampling, data recovery and decoding. At this point, a flag Displayed_Port indicates whether the input port Port(n) of the receiver Rx(n) is selected. If the input port Port(n) is selected, Displayed_Port=1, then the receiver Rx(n) continues to operate in the normal mode—the front-end circuit FE(n) continues to receive and process the data stream Si(n), retrieve (i.e., encrypts) content of the data stream Si(n) and the control signal, and provide the data enable signal DE. The multiplexer 22 transmits the data enable signal DE for the content protection circuit CP(n) to maintain content protection synchronization between the control signal provided by the front-end circuit FE(n) and the data enable signal DE, periodically update the encryption/decryption parameter and decrypt the encrypted content, so as to provide the data stream So(n) to be played. If the input port Port(n) is not selected, then the data stream So(n) of the input port Port(n) is not used for display, the receiver Rx(n) enters a status 32B.

Status 32B: Receiving the data enable signal DE until it becomes stable. When the receiver Rx(n) starts to receive the data stream Si(n), an unstable transient is present, the signals are stabilized after a time period. For example, it takes some time for the clock circuit 14 needs to lock with the clock CK, and the data enable signal DE is present only after the front-end circuit FE(n) obtains at least one complete frame. Under this situation, level transition time periods of the data enable signal DE (a time period for switching between the logic levels H and L) in horizontal intervals TH are continuously recorded and compared with each other to determine whether the data enable signal DE becomes stable. A flag DE_stable represents whether the data enable signal DE becomes stable. When DE_stable=0, it indicates unstable, and the receiver Rx(n) stays at the status 32B to wait; and when DE_stable=1, the receiver Rx(n) enters into status 32C.

Status 32C: data enable information is retrieved and recorded according to the data enable signal DE. A flag Record_OK indicates whether the recording completes. If Record_OK=0, the receiver Rx(n) stays at the status 32C until the recording completes; and when Record_OK=1, it indicates that the recording circuit 16 successfully retrieves and records the data enable information, then the receiver Rx(n) enters a status 32D.

Status 32D: after the data enable information is obtained, the receiver Rx(n) enters the power saving mode in the status 32D. In the power saving mode, the front-end circuit FE(n) only powers up during the VBIs 'Tvb' of each frame to obtain the control signal, and turns off during other intervals. The regenerating circuit 18 generates the regenerated enable signal DEr according to the data enable information, and the multiplexer 22 transmits the regenerated enable signal DEr to the content protection circuit CP(n) to replace the data enable signal DE. Accordingly, the content protection circuit CP(n) maintains content protection synchronization even if the front-end circuit stops providing the real-time data enable signal DE.

When the receiver Rx(n) operates in the power saving mode of the status 32D, in the event that the user wishes to switch the current source device via the switch circuit 12 (as shown in FIG. 1) to view content provided by the source device SD(n), then the input port Pout(n) with the receiver Rx(n) is selected, and the receiver Rx(n) rapidly switches from the status 32D to the status 32A. When the receiver Rx(n) stays in the status 32B or the status 32C for a long time period (over a threshold time period), it means that the receiver Rx(n) neither (within the threshold time period) reaches a steady status nor gets the data enable information. Under such situation, the receiver Rx(n) returns back to the status 32A to try to reach the steady status and recording of the data enable information again.

Figure 6:
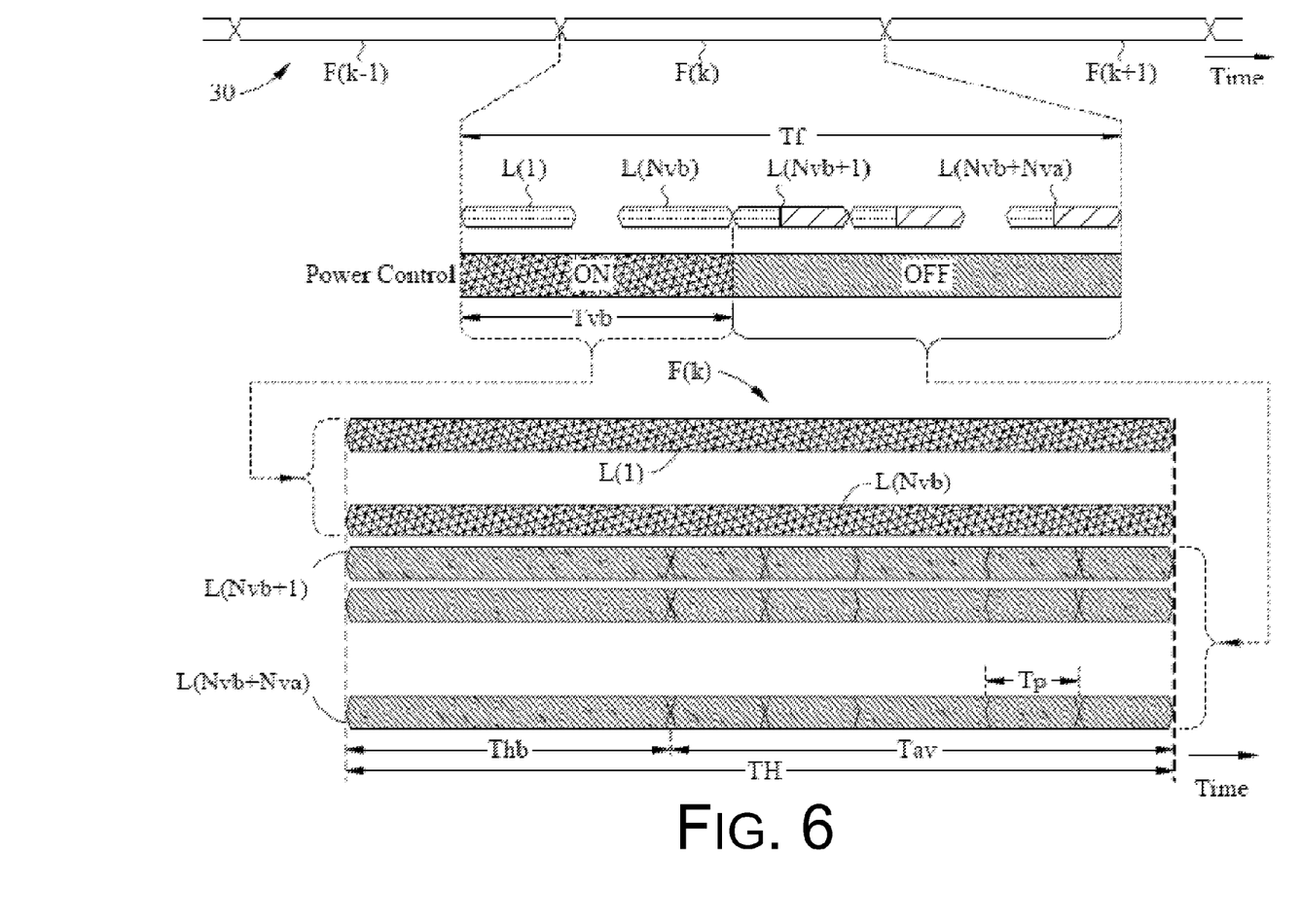
FIG. 6 is a schematic diagram of operating timing of the receiver, illustrated in FIG. 2, in a power saving mode illustrated in FIG. 5 in accordance with an embodiment of the present disclosure.

In association with FIG. 2, please refer to FIG. 6, which shows power control timing of the front-end circuit FE(n) in the power saving mode in accordance with an embodiment of the present disclosure. When the input port Port(n) is not selected, during each frame cycle Tf, the front-end circuit FE(n) is only turned on during the VBIs 'Tvb' (marked by "ON" in FIG. 6), and the front-end circuit FE(n) is turned off during other intervals corresponding to the line signals L(Nvb+1) to L(Nvb+Nva) carrying the pixel data (marked by "off" in FIG. 6), so as to reduce power consumption. When the front-end circuit FE(n) is off, the content protection circuit CP(n) does not perform decryption, it only maintains content protection synchronization. In another embodiment, the front-end circuit FE(n) is turned on during the HBIs 'Mb'. Data stream of certain formats carry control signals and/or information via the HBIs 'Mb', and according to the present disclosure, the front-end circuit FE(n) powers up during the HBIs Thb to receive the control signals and/or information. In a frame, because a time period of the VBI Tvb (and HBIs Thb) is short, the front-end circuit FE(n) powers down in most intervals so as to reduce a large amount of power consumption.

Referring to FIG. 4, in an embodiment of the present disclosure, in order to generate the regenerated enable signal DEr, a vertical enable signal VDE is provided via a line count value Lcount, and the regenerated enable signal DEr is generated via the vertical enable signal VDE and a pixel count value Pcount. According to the present disclosure, the pixel count value Pcount and the line count value Lcount are counted according to a pixel clock. During each horizontal interval TH, the pixel count value Pcount is from a horizontal initial value h0 and incrementing by one for every pixel cycle Tp. As mentioned above, the HBI Thb and the active interval Tav of each line signal of the data stream are defined according to the pixel cycle Tp, so that start time points and end time points of the HBIs Thb and the active intervals Tav respectively correspond to predetermined count values. Referring to FIG. 4, the start time points and the end time points of the HBIs Thb respectively correspond to the horizontal initial value h0 and a count value (Nhs−1), and the start time points and the end time points of the active intervals Tav respectively correspond to count values Nhs and Nhe. The count value Nhs is a pixel start point count value DE_start, and the Nhe is a pixel end point count value DE_end. When the pixel count value Pcount is greater than the pixel end point count value DE_end, the pixel count value Pcount is reset as the horizontal initial value h0.

In each frame, the line count value Lcount is counted from a vertical initial value v0 and incremented by one for every horizontal interval TH. Since each frame has plurality of horizontal intervals TH, and the VBI Tvb is formed by several horizontal intervals TH, start time points and end time points of the VBI Tvb and the line signals L(Nvb+1) to L(Nvb+Nva) respectively correspond to predetermined count values. Referring to FIG. 4, the start time point and the end time point of the VBI Tvb respectively correspond to the vertical initial value v0 and the a count value (Nvs−1), and the start time point and the end time point of the line signals L(Nvb+1) to L(Nvb+Nva) respectively correspond to count values Nvs and Nve. The count value Nvs is a vertical start point count value VDE_start, and the count value Nve is a vertical start point count value VDE_end. When the line count value Lcount is greater than the vertical end point count value VDE_end, the line count value Lcount is redefined as the vertical initial value v0.

As mentioned above, the timing characteristics of the data enable signal DE are: the start time point and the end time point of the active interval Tav of each horizontal interval TH and the start time point and the end time point of the line signals L(Nvb+1) to L(Nvb+Nva) of each frame. The information is represented by the pixel start point/end point count values and vertical start point/end point count values. That is, the data enable information recorded by the recording circuit 16 is the foregoing pixel start point/end point count values and the vertical start point/end point count values.

Figure 7:
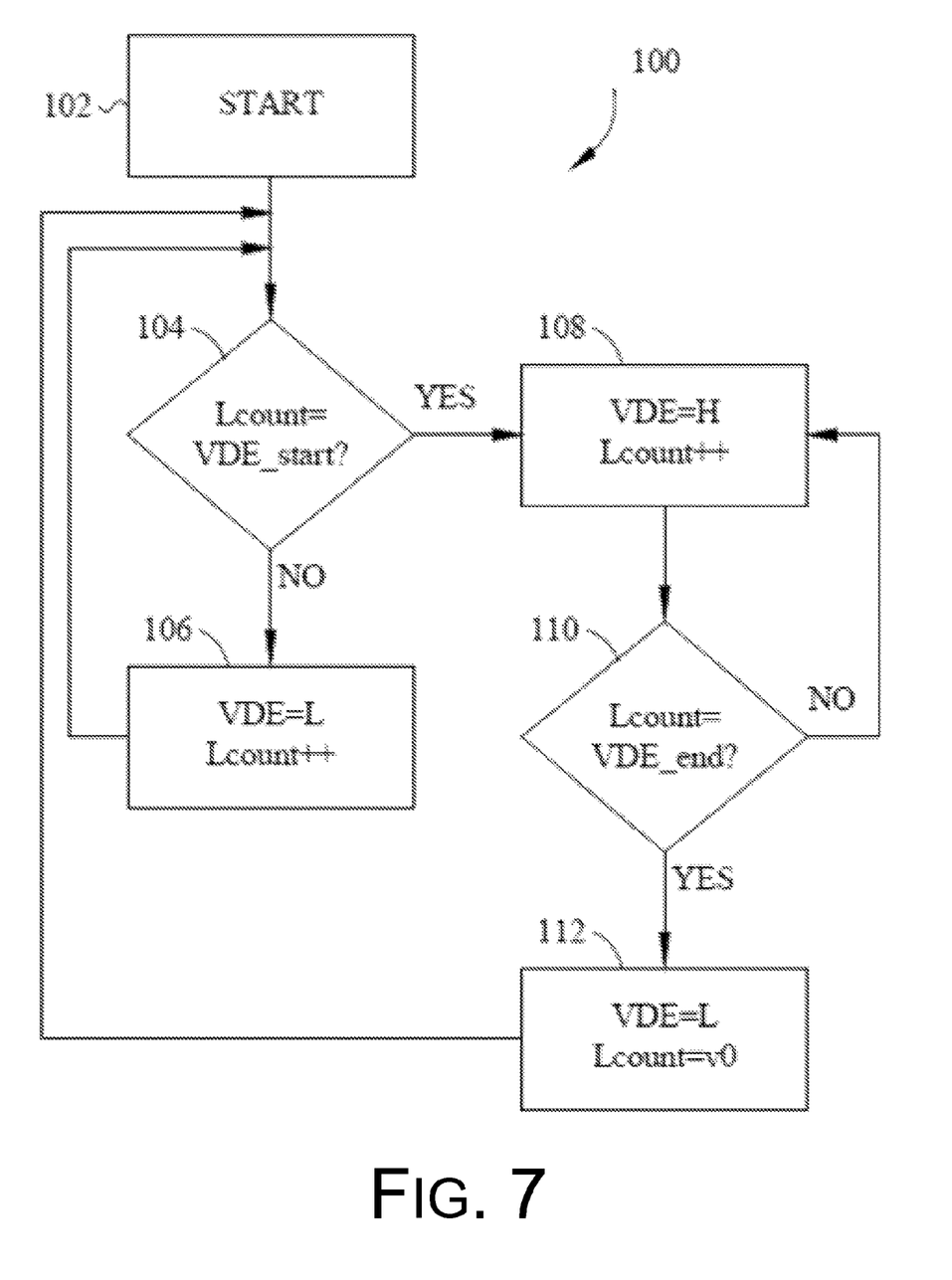
FIG. 7 and FIG. 8 are flow charts of flows for providing by the receiver illustrated in FIG. 2 a regenerated enable signal in accordance with embodiments of the present disclosure.
Figure 8:
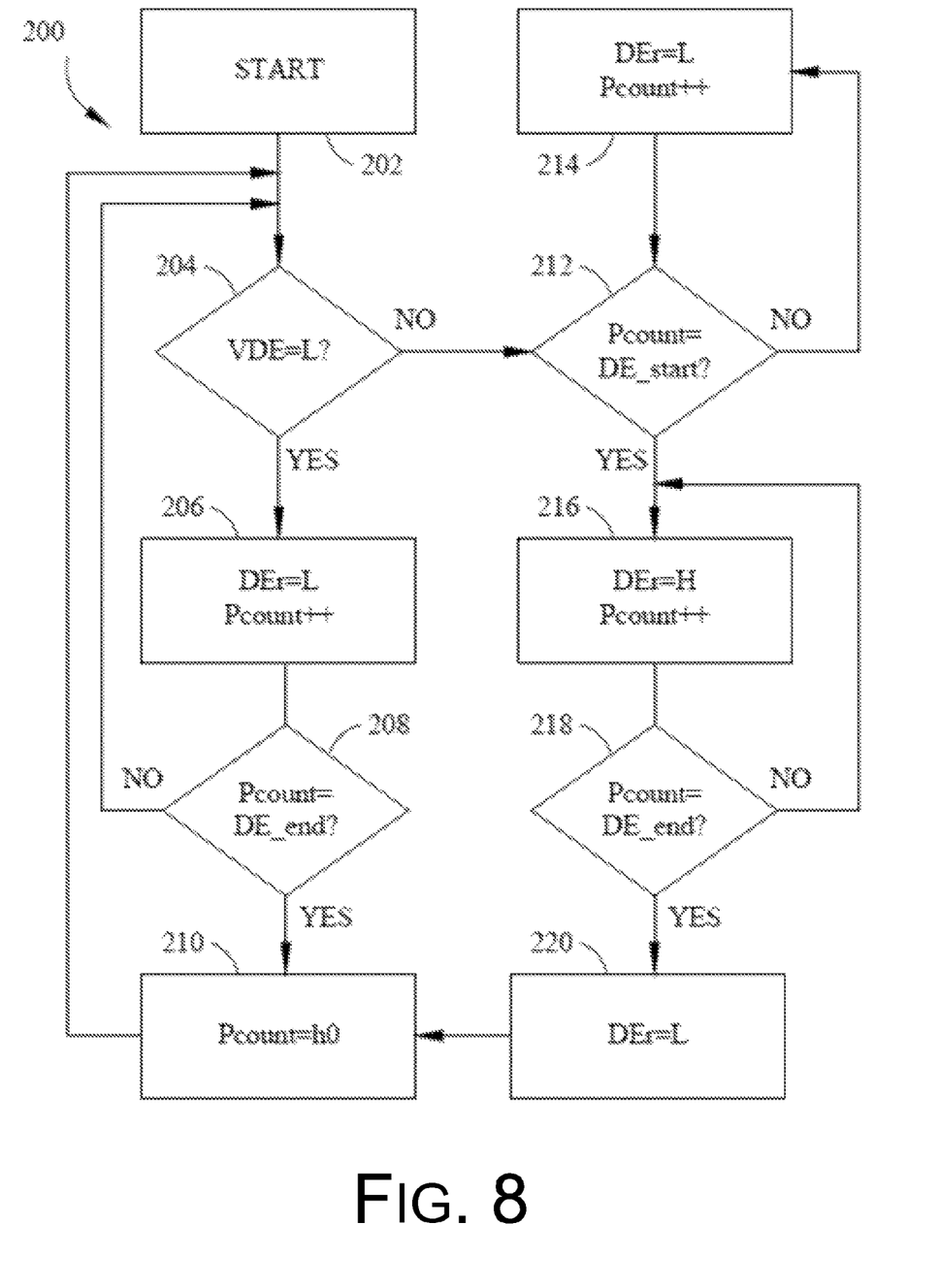

FIG. 7 shows a flow chart 100 providing the vertical enable signal VDE according to the line count value Lcount in accordance with an embodiment of the present disclosure. FIG. 8 shows a flow chart 200 providing the regenerated enable signal DEr according to the vertical enable signal VDE and the pixel count value Pcount. The flow 100 comprises steps below. When a frame starts to update, the flow 100 begins with Step 102 in which the line count value Lcount is defined as the vertical initial value v0. In Step 104, it is checked whether the line count value Lcount is equal to the vertical start point count value VDE_start. When the answer is negative, the flow 100 proceeds to Step 106; otherwise, the flow 100 proceeds to Step 108. In Step 106, the vertical enable signal VDE is set as logic level L, the line count value Lcount adds up by one in a next horizontal interval TH, and the flow 100 returns back to Step 104. In Step 108, the vertical enable signal VDE has the logic level H, the line count value Lcount increments by one during a next horizontal interval, and the flow 100 proceeds to Step 110. In Step 110, it is checked whether the line count value Lcount is equal to the vertical end point count value VDE_end. When the answer is negative, the flow 100 returns back to Step 108; otherwise, the flow 100 proceeds to Step 112. In Step 112, the vertical enable signal VDE has the logic level L, the line count value Lcount is set as vertical initial value v0, and the flow 100 returns back to Step 104.

The vertical enable signal VDE generated according to the flow 100 is identical to that as shown in FIG. 3 and FIG. 4. During a frame cycle Tf, when the flow 100 iterates Step 104 and Step 106, the vertical enable signal VDE remains at the logic level L during the VBI Tvb; and when the VBI Tvb ends, the flow 100 enters Step 108 and iterates Step 108 and Step 110, so that the vertical enable signal VDE remains at the logic level H. That is, the time period during which the vertical enable signal VDE remains at the logic level H corresponds to the lines signals L(Nvb+1) to L(Nvb+Nva) which are line signals carrying pixel data.

The flow 200 mainly comprises steps below. The flow 200 can process while flow 100 proceeds. In Step 202, the pixel count value Pcount is defined as the horizontal initial value h0. In Step 204, when the vertical enable signal VDE has the logic level L, the flow 200 proceeds to Step 206; otherwise, the flow 200 proceeds to Step 212. In Step 206, the regenerated enable signal DEr has the logic level L, the pixel count value Pcount increments by one during a next pixel cycle Tp, and the flow 200 proceeds to Step 208. In Step 208, when the pixel count value Pcount value is equal to the pixel end point count value DE_end, the flow 200 proceeds to Step 210; otherwise, the flow returns to Step 204 (or the flow 200 returns to Step 206). In Step 210, the pixel count value Pcount is reset as the horizontal initial value h0, and the flow 200 returns back to Step 204. In Step 212, when the pixel count value Pcount is equal to the pixel start point count value DE_start, the flow 200 proceeds to Step 216; otherwise, the flow proceeds to Step 214. In Step 214, the regenerated enable signal DEr has the logic level L, the pixel count value increments by one during a next pixel cycle Tp, and the flow 200 proceeds to Step 218. In Step 218, when the pixel count value Pcount is equal to the pixel end point count value DE_end, the flow 200 proceeds to Step 220; otherwise, the flow 200 returns back to Step 216. In Step 220, the regenerated enable signal DEr has the logic level L, and the flow 200 proceeds to Step 210.

Referring to FIG. 3 and FIG. 4, the regenerated enable signal DEr provided in the flow 200 is identical to the data enable signal DE. During the VBI Tvb of the frame cycle Tf, the vertical enable signal VDE remains at the logic level L, and the flow 200 iterates Step 204, Step 206, Step 208/Step 210, so that waveform of the regenerated enable signal DEr remains at the logic level L. When the VBI Tvb ends, the vertical enable signal VDE changes to the logic level H, and the flow 200 enters Step 212. During each HBI Thb of each horizontal interval TH after the VBI Tvb, the flow 200 iterates Step 212 and Step 214, so that the regenerated enable signal DEr remains at the logic level L. During the active intervals Tav, the flow 200 iterates Step 216 and Step 218, so that the regenerated enable signal DEr remains at the logic level H.

In conclusion, the regenerating 18 generates the regenerating enable signal DEr via two simple counters respectively corresponding to the line count value Lcount and the pixel count value Pcount. When the line count value Lcount is within the vertical start point count value VDE_start and the vertical end point count value VDE_end, and the pixel count value Pcount is within a range from the pixel start point count value DE_start to the pixel end point count value DE_end, the regenerated enable signal DEr has the logic level H; otherwise, the regenerated enable signal DEr has the logic level L. Accordingly, the level changes of the regenerated enable signal DEr are identical to those of the data enable signal DE, so that the regenerated enable signal DEr can replace the data enable signal DE. Compared to the mixed analog-digital front-end circuit FE(n), since the regenerating circuit 18 is realized by a counter of a digital circuit, the power consumption is reduced, which effectively increases power efficiency of the receiver Rx(n).

Alternatively, according to the present disclosure, other signals are generated via the flow 100 and/or the flow 200 in the power saving mode. For example, a signal having a cycle equal to the frame cycle Tf is generated according to a principle of the flow 100, e.g., the signal is a vertical synchronization signal. A signal having a cycle equal to the horizontal interval TH is generated by removing Step 204, Step 206 and Step 208 from the flow 200 and directly performing Step 212 after Step 202, e.g., the signal is a horizontal synchronization signal.

In conclusion, according to the present disclosure, the application of the multiple input ports is capable of balancing seamless switch with power efficiency. A front-end circuit of an unselected input port enters a power saving mode without providing a data enable signal DE to reduce power consumption. According to a simplified technique consuming a less amount of power of the present disclosure, a regenerated enable signal DEr identical to the data enable signal DE is provided to maintain content protection synchronization in the unselected input port so as to realize seamless switch. Although the technique application provided by the present disclosure is described by taking a multi-port interface circuit having a plurality of input ports shown in FIG. 1 as an example, the technique is also applied to a playback apparatus having a single input port. For example, when some certain playback apparatuses enters a sleep status and stops playing, in the event that the playback apparatuses need to recover playback after content protection synchronization is lost in the sleep status, it takes a time period to re-identify the content protection. When the technique provided by the present disclosure is applied to such type of playback apparatuses, not only power consumption is reduced in the sleep status, but also content protection synchronization is simultaneously maintained to rapidly recover playback. The technique provided by the present disclosure is widely applied to apparatuses conforming to types of content protection protocols that need to be maintained synchronization, e.g., the high-bandwidth digital content protection (HDCP) protocol.

While the present disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A power saving method, adapted to a multi-port interface circuit comprising a plurality of receivers each of which configured with a respective front-end circuit, the method comprising:
the front-end circuit of at least one of the receivers, in a normal mode, processing a data stream to generate a data enable signal and recording data enable information associated with the data enable signal; and
the front-end circuit of the at least one of the receivers, in a power saving mode, stopping receiving the data stream and generating a regenerated enable signal according to the data enable information.

2. The method as recited in claim 1, wherein the data stream comprises a plurality of active intervals and a plurality of blanking intervals, each blanking interval is in between respective two of the active intervals, and wherein the data enable information is associated with a start time point and an end time point of the active intervals.

3. The method as recited in claim 2, wherein the data stream comprises a plurality of pixel data in the active intervals, the data stream corresponding to a clock having cycles synchronized with that of the pixel data, the method further comprising:
counting from the start time point to the end time point of each active interval according to the clock to provide a start point count value and an end point count value; and
in the power saving mode, generating the regenerated enable signal according to the clock, the start point count value, and the end point count value.

4. The method as recited in claim 3, further comprising:
in the power saving mode, accumulating a count value according to the cycles of the clock;
when the count value matches with the start point count value, changing the regenerated enable signal from a first logic level to a second logic level; and
when the count value matches with the end point count value, changing the regenerated enable signal from the second logic level to the first logic level.

5. The method as recited in claim 1, wherein the data stream comprises a plurality of frames, each frame comprising a plurality of first horizontal intervals and a plurality of second horizontal intervals, each second horizontal interval having an active interval and a horizontal blanking interval, the method further comprising:
providing the data enable information according to a start time point and an end time point of the second horizontal intervals of each frame, and a start time point and an end time point of each active interval of the second horizontal intervals; and
in the power saving mode, processing by the front-end circuit of the at least one of the receivers the data stream in the first horizontal intervals to generate a control signal and stopping the front-end circuit of the at least one of the receivers from processing the data stream in the second horizontal intervals.

6. The method as recited in claim 5, further comprising:
counting from the start time point to the end time point of the second horizontal intervals of each frame according to a clock to provide a vertical start point count value and a vertical end point count value; and
counting from the start time point to the end time point of the active interval of each second horizontal interval according to the clock to provide a pixel start count value and a pixel end point count value, wherein the data enable information is associated with the pixel start count value, the pixel end point count value, the vertical start point count value and the vertical end point count value.

7. The method as recited in claim 6, further comprising:
in the power saving mode, accumulating a pixel count value and a line count value according to the clock; and
when the line count value is within the vertical start point count value and the vertical end point count value, and the pixel count value is within the pixel start point count value and the pixel end point count value, setting the regenerated enable signal at a second logic level; otherwise, setting the regenerated enable signal at a first logic level.

8. The method as recited in claim 7, further comprising:
when the line count value is greater than the vertical end point count value, setting the line count value as a vertical initial value; and
when the pixel count value is greater than the pixel end point count value, setting the pixel count value as a horizontal initial value.

9. The method as recited in claim 1, wherein each receiver further comprises a content protection circuit updating an encryption/decryption parameter according to a signal, the method further comprising:
when the front-end circuit of the at least one of the receivers generates the data enable signal, updating the encryption/decryption parameter according to the data enable signal; and
in the power saving mode, updating the encryption/decryption parameter according to the regenerated enable signal.

10. The method as recited in claim 1, further comprising:
when one of the front-end circuits receives the data stream, the other front-end circuits entering the power saving mode.

11. A multi-port interface circuit, comprising:
a plurality of receivers, each receiver comprising:
a front-end circuit, operable in a normal mode and a power saving mode, that processes a data stream to generate a data enable signal when the front-end circuit operates in the normal mode, and that stops receiving the data stream when the front-end circuit is in the power saving mode;
a recording circuit, coupled to the front-end circuit, that records a data enable information associated with the data enable signal; and
a regenerating circuit, coupled to the recording circuit, that generates a regenerated enable signal according to the recorded data enable information when the front-end circuit is in the power saving mode.

12. The multi-port interface circuit as recited in claim 11, wherein the data stream comprises a plurality of frames, each frame comprising a plurality of first horizontal intervals and a plurality of second horizontal intervals, each second horizontal interval comprising an active interval and a horizontal blanking interval, wherein the recording circuit records the data enable information according to a start time point and an end time point of the second horizontal intervals of each frame and a start time point, and an end time point of the active interval of each second horizontal interval, wherein the front-end circuit processes the corresponding data stream in the first horizontal intervals to generate a control signal when the front-end circuit operates in the power saving mode, and wherein the front-end circuit stops processing the data stream in the second horizontal intervals.

13. The multi-port interface circuit as recited in claim 11, wherein each receiver further comprises:
a clock circuit that provides a clock to the data stream, wherein the recording circuit records a vertical start point count value and a vertical end point count value according to the start time point and the end time point of the second horizontal intervals by counting of the clock, and further records a pixel start point count value and a pixel end point count value according to the start time point and the end time point of the active interval of each second horizontal interval by counting of the clock, and wherein the data enable information is associated with the pixel start point count value, the pixel end point count value, the vertical start point count value, and the vertical end point count value.

14. The multi-port interface circuit as recited in claim 13, wherein the regenerated circuit accumulates a pixel count value and a line count value according to the clock when the front-end circuit is in the power saving mode, and wherein, when the line count value is within the vertical start point count value and the vertical end point count value and the pixel count value is within the pixel start point count value and the pixel end point count value, the regenerated circuit sets the regenerated enable signal at a second logic level; otherwise, the regenerated circuit sets the regenerated enable signal at a first logic level.

15. The multi-port interface circuit as recited in claim 14, wherein when the line count value is greater than the vertical end point count value, the regenerated circuit sets the line count value as a vertical initial value, and wherein, when the pixel count value is greater than the pixel end point count value, the regenerated circuit sets the pixel count value as a horizontal initial value.

16. The multi-port interface circuit as recited in claim 11, each receiver further comprising:
   a content protection circuit; and
   a multiplexer, coupled to the front-end circuit, the regenerated circuit, and the content protection circuit, that transmits the data enable signal to the content protection circuit when the front-end circuit operates in the normal mode, and that transmits the regenerated enable signal to the content protection circuit when the front-end circuit is in the power saving mode, the content protection circuit updating an encryption/decryption parameter according to the data enable signal or the regenerated enable signal transmitted by the multiplexer.

17. The multi-port interface circuit as recited in claim 11, wherein, when one of the receivers operates in the normal mode, the other receivers operate in the power saving mode.

* * * * *